US008996400B2

(12) United States Patent
Frazier et al.

(10) Patent No.: US 8,996,400 B2
(45) Date of Patent: Mar. 31, 2015

(54) SYSTEM AND METHOD FOR TRANSFER OF DIGITAL MEDIA

(75) Inventors: Milton Massey Frazier, San Marcos, CA (US); Jason R. Meerbergen, San Diego, CA (US); Gen Tsuchikawa, San Diego, CA (US); Edgar Allan Tu, Poway, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 2380 days.

(21) Appl. No.: 11/809,974

(22) Filed: Jun. 4, 2007

(65) Prior Publication Data

US 2008/0300901 A1 Dec. 4, 2008

(51) Int. Cl.
*G06Q 30/06* (2012.01)

(52) U.S. Cl.
CPC .................................... *G06Q 30/06* (2013.01)
USPC .................................... 705/14.23; 705/14.39

(58) Field of Classification Search
None
See application file for complete search history.

(56) References Cited

U.S. PATENT DOCUMENTS

| | | | | |
|---|---|---|---|---|
| 6,550,011 | B1 * | 4/2003 | Sims, III | 713/193 |
| 6,957,220 | B2 | 10/2005 | Lamkin et al. | 707/100 |
| 2003/0125964 | A1 * | 7/2003 | Chang et al. | 705/1 |
| 2006/0190410 | A1 * | 8/2006 | Harper | 705/59 |
| 2006/0276174 | A1 | 12/2006 | Katz et al. | 455/410 |

OTHER PUBLICATIONS

Website printout: CoreMedia "Musicshare—Sharing music and recommendation in social networks", http://www.coremedia.com/en/115972/musicshare/ printed Mar. 29, 2007.

* cited by examiner

*Primary Examiner* — Ryan Zeender
*Assistant Examiner* — Hajime Rojas
(74) *Attorney, Agent, or Firm* — John L. Rogitz

(57) ABSTRACT

Digital content can be sold by an original sales entity (OSE) to an affiliate sales entity (ASE) for playing of the content by the ASE. The ASE is permitted to transfer the content to another ASE, and sales credit for the secondary transfer is split between the transferring ASE and the OSE upon synchronization of a ledger of the recipient ASE with the system database.

7 Claims, 3 Drawing Sheets

SYSTEM

LEDGER DATA STRUCTURE

PROCESS

SYSTEM AND METHOD FOR TRANSFER OF DIGITAL MEDIA

I. FIELD OF THE INVENTION

The present invention relates generally to systems and methods for transferring digital media, and more particularly to promoting the sales of digital media.

II. BACKGROUND OF THE INVENTION

With the ease of transferring digital multimedia such as songs over the Internet and on storage media, complications have arisen for original sales entities such as music stores, as well as for content providers, in obtaining remuneration for each duplicated piece of copyrighted content. One approach in addressing this problem is through "digital rights management" (DRM), which typically involves various encryption schemes and copy rules that are expected to be implemented in compliant player devices.

As understood herein, implementing DRM is somewhat akin to swimming against the tide, in that it is ultimately possible to defeat almost any encryption scheme, the imposition of DRM frustrates and annoys many consumers, and consumers typically find innovative ways to freely transfer digital content among themselves anyway. Furthermore, DRM can retard sales, whereas it is generally desirable to promote sales. Accordingly, while DRM has its place including as part of some implementations of the present invention, the present invention recognizes that it is desirable to promote sales of content without undue restrictions yet in a way in which all parties, including original sales entities (and, thus, content providers) profit.

SUMMARY OF THE INVENTION

A method is disclosed that includes selling content from an original sales entity (OSE) to a first affiliate sales entity (ASE), and then permitting the first ASE to transfer the content to a second ASE such that the second ASE receives the content from the first ASE. The method includes synchronizing the second ASE with a system database to exchange ledger information therebetween. The ledger information is used to credit a first portion of a sales amount to the first ASE and a second portion of the sales amount to the OSE.

In some embodiments the first ASE can be associated with plural multimedia players, and transfers of the content between the players within the first ASE are cost-free. The initial sale can be effected by transferring a token from the OSE to the first ASE, with the token including an encrypted identification such as a seller unique ID (SUID) of the OSE. The token can be stored in a ledger associated with the first ASE for subsequent transfer at least of the SUID to the second ASE. In other implementations, the ASE-to-ASE transfer need not be for remuneration. Instead, the content can be transferred without a CID from the first ASE to the second ASE in a cost-free transaction, with a record of cost-free transfer of the content being maintained and then transferred to the OSE for monitoring purposes.

In another aspect, a system includes an original sales entity (OSE) vending multimedia content and at least first and second affiliate sales entities (ASE). A system database records transaction information. The OSE can sell content to the first ASE, the first ASE can transfer content to the second ASE, and only upon sending secondary transfer information from the second ASE to the database is sales credit given to the OSE and first ASE.

In another aspect, computer readable media bearing instructions executable by digital processors include means for transferring, from an original sales entity (OSE) to a first affiliate sales entity (ASE), a piece of digital entertainment content in exchange for remuneration. The media also include means for transferring, from the first ASE to a second ASE, the piece of content, and means for crediting both the OSE and first ASE for the transfer of content from the first ASE to the second ASE.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
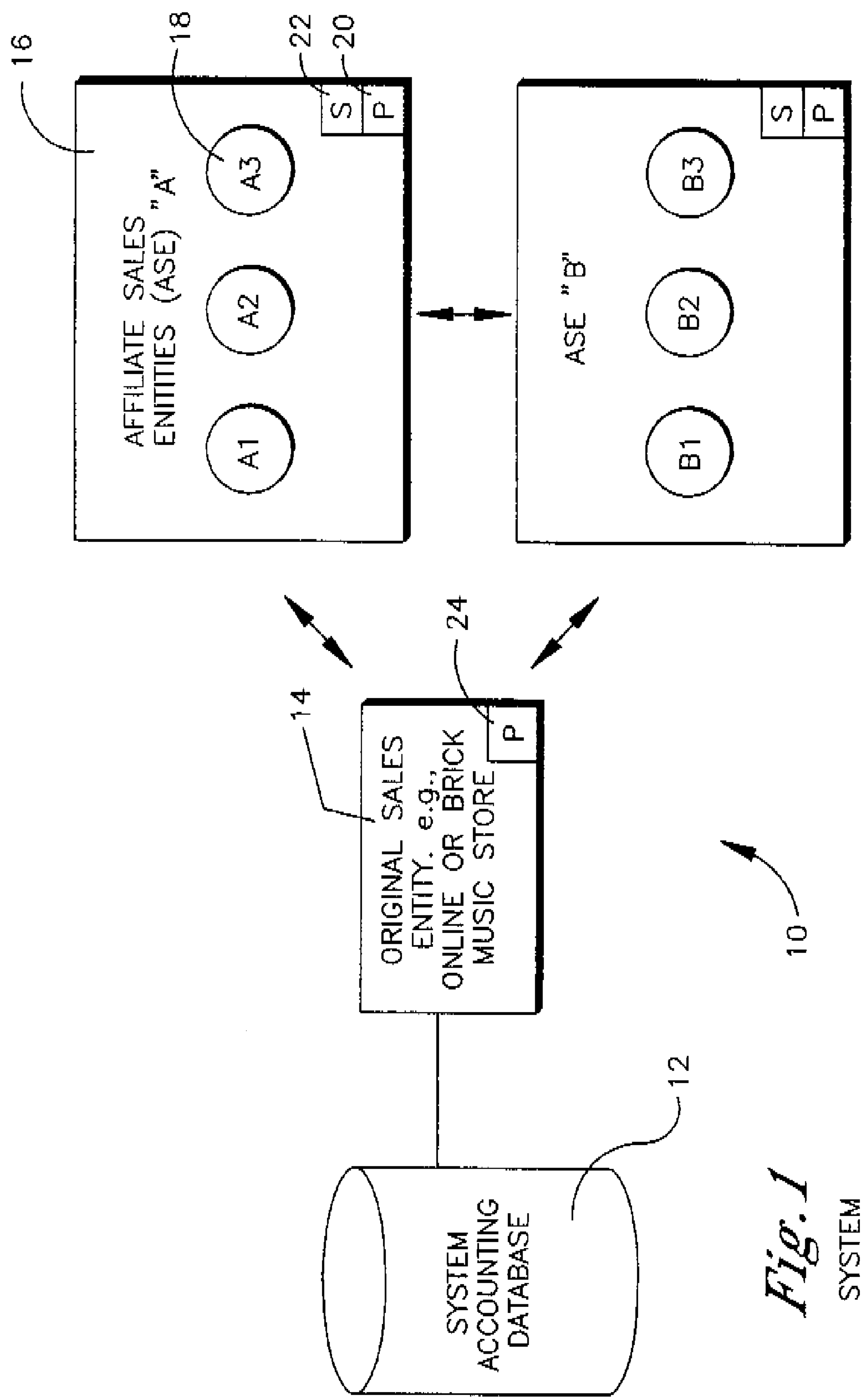
FIG. 1 is a block diagram of a non-limiting implementation of the present invention.

Referring initially to FIG. 1, a system is shown, generally designated 10, that creates a natural environment the promotes the purchase of content, that advantageously can be free of DRM (Digital Rights Management) software or code if desired. As shown, the system 10 includes a system database 12 that may be associated with one or more original sales entities (OSE) 14. Each OSE 14 may be identified with a seller unique ID (SUID). The OSE 14 may be an online or offline store or distribution entities for the purpose of conducting an original sale of content.

The database 12 can communicate with plural affiliate sales entities (ASE) 16 directly and/or through the OSE 14 via, e.g., the Internet or other communication path. Each ASE 16 may be, for example, a person or organization or controller computer that includes or is associated with plural entertainment players 18, each preferably with a unique device ID (DID), and in some implementations includes an ASE processor 20 and an ASE data store 22 such as disk-based or solid state storage. Likewise, the OSE 14 may include an OSE processor 24.

To participate as an ASE, a user or owner registers one or more of the ASE devices 18 within the system 10. This results in a unique identifier tied to each device 18 and correlated in a one-to-many relationship with the associated ASE 16 (which can be an individual, group of individuals or any other entity or group).

The system 10, as more fully disclosed below, is intended to create an environment to share content cost-free from one device 18 within an ASE 16 to another device 18 in the same ASE 16, and to sell content from one ASE 16 to another ASE 16.

Figure 2:
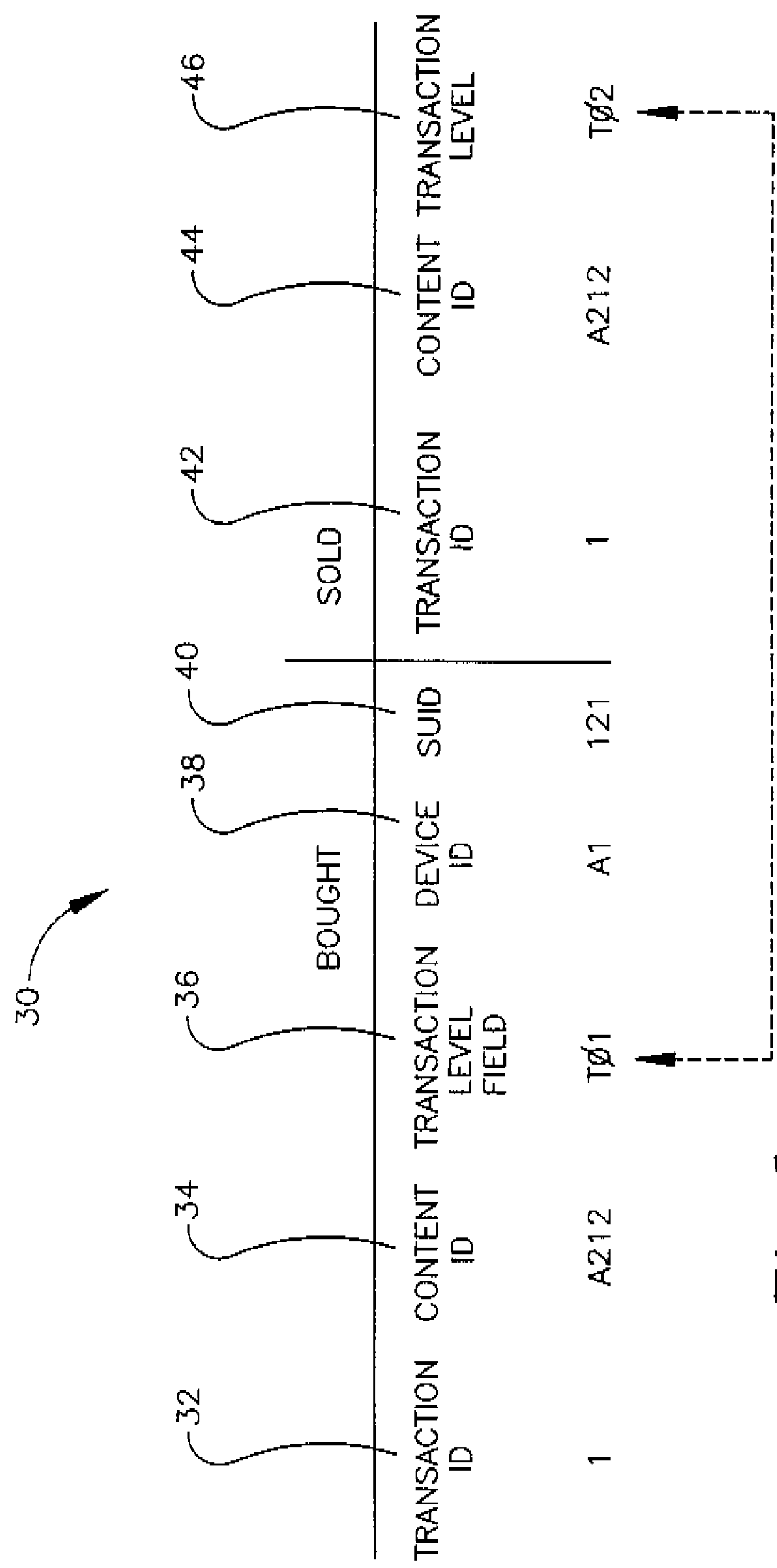
FIG. 2 is a schematic diagram of a non-limiting data structure for a device transaction ledger.

To this end, the non-limiting data structure 30 shown in FIG. 2 may be used. In essence, the data structure 30 may be regarded as a ledger of "bought" and "sold" transactions, and each ASE 16 may maintain its own ledger. Each "bought" or "sold" record may be regarded as a "token" and may include the following fields: a transaction ID field 32, which is an identification uniquely identifying the transaction in either the "bought" or "sold" category and which itself may include data related to the transaction which can be reconciled by the system database for determining proper remuneration for each ASE; a content ID field 34, which uniquely identifies the piece of content that is the subject of the transaction; a transaction level field 36, which identifies the level of the transaction as more fully discussed below; a device ID field 38, which uniquely identifies the particular device 18 of the ASE 16 (equivalently, which uniquely identifies the ASE 16 itself) from which content is sold; and a field 40 identifying the above-mentioned SUID, which may be encrypted.

Likewise, the "sold" side of the ledger may include a transaction ID field 42, a CID field 44, and a transaction level field 46. To briefly describe the concept of transaction level using FIG. 2, when the ASE 16 that is associated with the data structure 30 buys content from the OSE 14, this is an original transaction and hence is at transaction level "1". In contrast, when the ASE 16 associated with the data structure 30 sells the same piece of content to another ASE 16, this is recorded on the sold side of the ledger as transaction level "2". In the event that the buying ASE 16 should subsequently sell the content yet again to a third ASE, then the transaction level of that sale would be "3", and so on.

Accordingly, a token may be used to record transaction information. In the case of content that is merely exchanged between ASEs 16 in a cost-free transaction, the CID and transaction level need not be recorded. Indeed, in such transactions there may be no CID to record. For example, an MP3 file can be converted from a compact disk audio file, uploaded to a device and shared with another device. The process for transfer would be similar except that a give token is sent from the distributing device and a get token is sent back once the transfer was complete. The transaction is recorded with the data required to record a sharing transaction, but excludes certain pieces of information (for example, transaction level) that otherwise would be recorded in a buy/sell transaction. In this case, give/get tokens are uploaded to the system 10 during synchronization simply as tracking information.

In any case, tokens may also be used for authentication of devices for device-to-device (ASE-to-ASE) transactions of content and information, and/or for authentication of an ASE 16 to the system database 12 for reconciliation of transactions. In this way, tokens can be used to initiate and authenticate the following types of transactions, including: sell, buy, account settlement, device credit updating functions, sharing (giving and getting). This is done by, e.g., the devices successfully decrypting the SUID and comparing it against a list of authorized SUIDs (of OSEs and ASEs) prior to agreeing to consummate the transaction.

Tokens may also be used for other functions as required by the system 10 or by peer-to-peer sharing devices for reconciliation, content transfer or authentication. Tokens can be transferred either through wire-based (e.g. connected) or wireless (Wi-Fi, Bluetooth, RFID, Infrared, etc.) links, typically over an IP-based network. Furthermore, tokens can be accompanied by other data, files, or content in the transaction process. Each token, as stated above, can store encrypted data that, once the token is deemed to be authentic, subsequently can be transferred pursuant to follow-on transactions.

Figure 3:
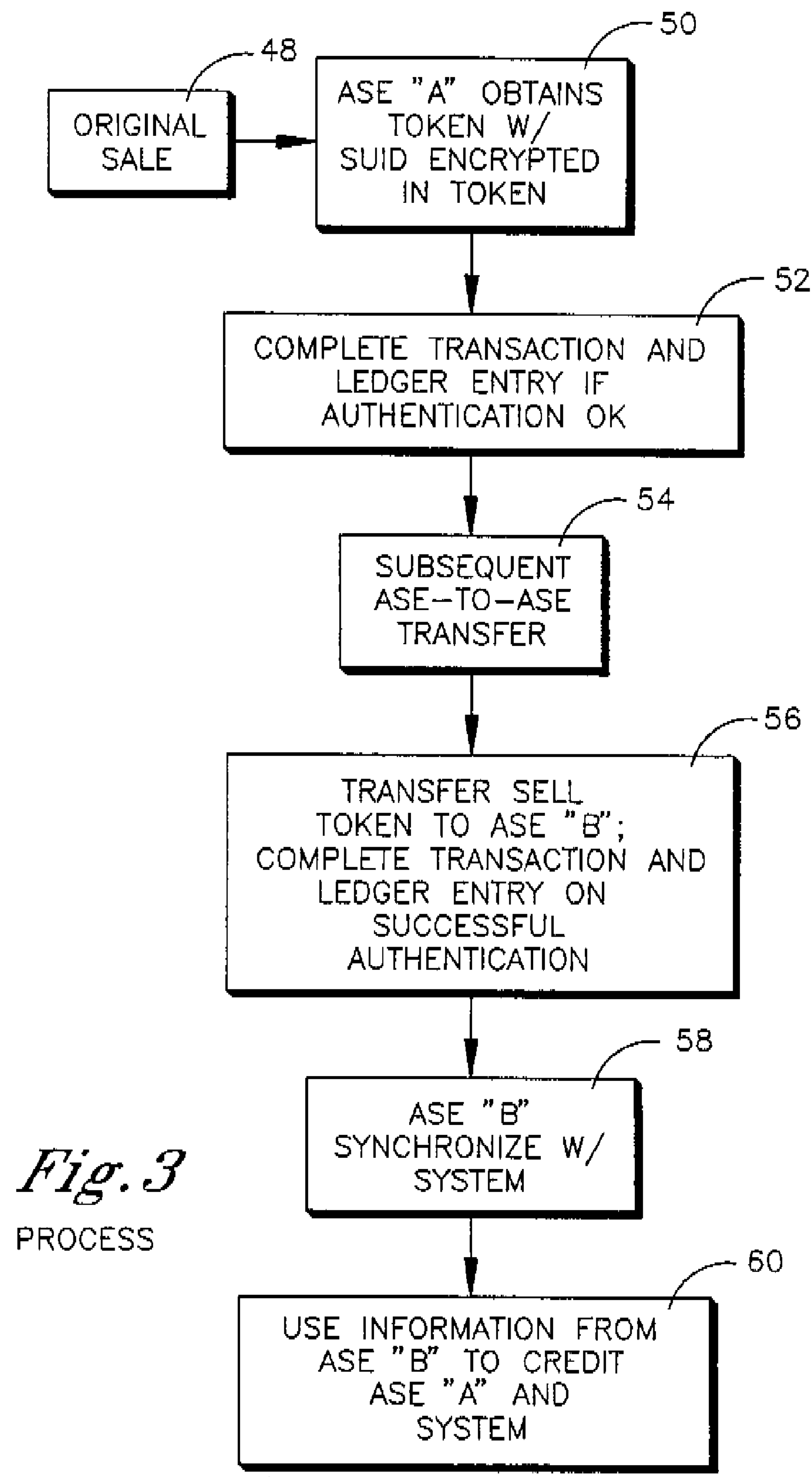
FIG. 3 is a flow chart of non-limiting logic in accordance with present principles.

Now referring to FIG. 3, logic in accordance with present principles may be seen. The logic can be executed by one or more of the processors described above, and typically is stored on computer-readable medium such as but not limited to disk-based and solid state-based media. An original sale can be entered into at block 48, in which an ASE 16 indicates an intent to purchase a piece of digital multimedia content (such as a song) from the OSE 14. At block 50 the ASE 16 at a minimum receives from the OSE 14 the encrypted SUID of the above-described token and uses it for authentication as described above. It is to be understood that cross-authentication may be effected by sending an encrypted DID of the ASE 16 to the OSE 14 for decryption and authentication.

Assuming authentication does not fail, the logic moves to block 52 to receive any additional parts of the token (such as returned DID) and the content itself, along with its CID. The ledger entry shown in FIG. 2 is completed. It is to be understood that in non-limiting embodiments the ASE 16 "A", for instance, shown in FIG. 1 can be pre-charged by credit card to establish a balance with which to purchase content. The balance can be added to by follow-on sales as described further below. However, how balances are initiated are not essential to the present inventive concept.

A subsequent ASE-to-ASE transfer may be initiated at block 54, wherein upon successful authentication in accordance with principles discussed above the ledger entry shown in FIG. 2 is completed at block 56 on the "sold" side for the selling ASE 16, while an entry like the one shown in FIG. 2 on the "bought" side is made in the ledger of the buying ASE 16. When the transaction is a share transaction not involving remuneration, as mentioned above certain portions of the ledger entries may be omitted. The content is transferred from selling ASE 16 to buying ASE 16.

Proceeding to block 58, upon such time as the buying ASE 16 in block 56 synchronizes its ledger with the system database 12, the following steps may be executed. Synchronization can occur as frequently or as infrequently as the user desires, or as required by conditions set on the ASEs by the system 10. Upon synchronization, the "bought" and "sold" tokens in the ledger of the ASE 16 are sent to the system 10 and used at block 60 to credit the ASEs whose DIDs are identified in the "bought" tokens with sales, and to decrement the balance of the buying ASE accordingly. The system 10 service (in one implementation, the OSE 14) is also credited with sales as set forth further below. The ASE credits may be redeemed in future purchases or may be redeemed for cash from the system 10.

In crediting ASEs with sales, the percentage of sales price given to various ASEs in the chain can vary with transaction level, content, etc. and can be changed dynamically. Consider the following example for illustration. Suppose it is determined that for an original sale (transaction level=1) the OSE 14 receives the entire sales amount. Then suppose that for an initial (transaction level=2) ASE-to-ASE transaction it is determined that the OSE 14 receives seventy five percent of the sales amount, and the selling ASE receives twenty five percent. Then suppose that for a subsequent ASE-to-ASE transaction (level=3), the first two selling ASEs each are credited with twenty five percent of the sales price and the OSE 14 is credited with fifty percent. For a fourth level transaction, the upper three ASEs might each be credited with twenty five percent of the sales price and the OSE with twenty five percent. Or, for the fourth level transaction the first ASE in the chain might receive nothing, with the two ASEs "closest" to the sale receiving twenty five percent each and the OSE receiving fifty percent. In this latter case, assuming a sale price of one dollar, the OSE would receive $1+$0.75+$0.50+$0.50=$2.75 total, a much larger profit than the initial sale to the first ASE.

It now may be appreciated that data captured and recorded on the transaction ledgers is derived from a variety of sources including information resident on the device, information transferred by token for authentication and initiation of a transaction, information transferred from ASE to ASE by token or by file, information transferred from the system database 12 (or OSE 14) to an ASE, or by file upload from a foreign device (e.g., a PC).

While the particular SYSTEM AND METHOD FOR TRANSFER OF DIGITAL MEDIA is herein shown and described in detail, it is to be understood that the subject matter which is encompassed by the present invention is limited only by the claims.

What is claimed is:

1. A method compromising:

selling content from an original sales entity (OSE) to a first affiliate sales entity (ASE);

permitting the first ASE to transfer the content to a second ASE such that the second ASE receives the content from the first ASE in a transaction;

synchronizing the second ASE with a system database to exchange ledger information therebetween; and using the ledger information to credit a first portion of a sales amount to the first ASE and a second portion of the sales amount to the OSE, wherein the OSE is associated with a seller unique identification (SUID) and a token including an encrypted version of the SUID is conveyed with the content, and the first and second ASEs must successfully decrypt the SUID and compare it against a list of authorized SUIDs to verify that the SUID is on the list prior consummating the transaction.

2. The method of claim 1, wherein the first ASE is associated with plural multimedia players, and transfers of the content between the players within the first ASE are cost-free.

3. The method of claim 1, wherein the token is stored in a ledger associated with the first ASE for subsequent transfer at least of the SUID to the second ASE during the act of permitting.

4. The method of claim 1, wherein he content is first content associated with a content identification (CID) and the method further comprises:

transferring second content without a CID from the first ASE to the second ASE in a cost-free transaction;

maintaining a record of cost-free transfer of the second content at least on the first and/or second ASE; and transferring the record of cost-free transfer to the OSE.

5. The method of claim 1, wherein the ledger information includes a transaction level ID.

6. The method of claim 5, wherein the ledger information includes a device ID.

7. The method of claim 1, wherein the second. ASE transfers the content to a third ASE and receives a third portion of the sales amount therefor.

* * * * *